United States Patent

Mao

Patent Number: 5,496,661
Date of Patent: Mar. 5, 1996

[54] SIMPLIFIED PREPARATION OF LIPF$_6$ BASED ELECTOLYTE FOR NON-AQUEOUS BATTERIES

[75] Inventor: Huanyu Mao, Burnaby, Canada

[73] Assignee: Moli Energy (1990) Limited, Canada

[21] Appl. No.: 272,249

[22] Filed: Jul. 8, 1994

[30] Foreign Application Priority Data

Aug. 24, 1993 [CA] Canada ................... 2104718

[51] Int. Cl.$^6$ .................................................. H01M 6/16
[52] U.S. Cl. ........................................ 429/194; 429/189
[58] Field of Search ................................. 429/194, 189

[56] References Cited

U.S. PATENT DOCUMENTS

| | | |
|---|---|---|
| 3,654,330 | 4/1972 | Wiesboeck . |
| 4,803,138 | 2/1989 | Kobayashi .................. 429/194 |
| 4,880,714 | 11/1989 | Bowden . |
| 5,272,022 | 12/1993 | Takami et al. ............ 429/194 |
| 5,358,658 | 10/1994 | Pradhan et al. .......... 429/194 |
| 5,378,445 | 1/1995 | Salmon et al. . |

*Primary Examiner*—Prince Willis, Jr.
*Assistant Examiner*—Carol Chaney
*Attorney, Agent, or Firm*—Lerner, David, Littenberg, Krumholz & Mentlik

[57] ABSTRACT

A simple method is disclosed for preparing LiPF$_6$ based electrolytes for use in lithium non-aqueous batteries. LiPF$_6$ is synthesized in a mixture of solvents employed in the electrolyte itself. Using the invention method, residual reactants and by-products of the reaction are easily removed to a required level for practical battery applications while the LiPF$_6$ remains in solution. The method is suitable for preparing electrolytes for lithium ion batteries wherein solvents such as diethylcarbonate, ethylene carbonate, and propylene carbonate are employed.

14 Claims, 4 Drawing Sheets

SIMPLIFIED PREPARATION OF LIPF$_6$ BASED ELECTROLYTE FOR NON-AQUEOUS BATTERIES

FIELD OF THE INVENTION

This invention pertains to the field of batteries, and in particular to a novel method of preparing a LiPF$_6$ electrolyte solution for non-aqueous lithium batteries.

BACKGROUND OF THE INVENTION

The demand for higher energy density power sources for electronics devices is continually increasing as these devices shrink in size. This demand is being increasingly met using recently developed lithium primary and rechargeable battery systems. The commercial success of such systems, in part, relies on the availability of suitable non-aqueous electrolytes. High voltage (>3 V) and high rate (of order of 1C rate) lithium battery systems require an electrolyte that is stable over a wide range in potential and has relatively high ionic conductivity. Only a handful of lithium salts currently exist that are suitable candidates for use in such electrolytes. The salt LiPF$_6$ is one of these, and has received wide attention since it is also low in toxicity and stable in solution. Recently, Sony Energy Tec Inc. has produced the first commercially available lithium ion type battery in which the electrolyte contains LiPF$_6$ salt dissolved in a mixture of diethylcarbonate (DEC) and propylene carbonate (PC) solvents.

LiPF$_6$ based electrolytes are generally prepared by dissolving solid LiPF$_6$, or a complex thereof, in the desired electrolyte solvents.

The heat of solution can be significant, and generally some means of temperature control must be used to prevent overheating and subsequent decomposition of the salt. LiPF$_6$ itself can be prepared using one of several methods described in the literature. Many of these methods however result in a product with levels of impurities that are unsuitable for use in battery applications. For example, LiPF$_6$ can be made by reacting BF$_3$ with LiF and an excess of P$_2$O$_5$, but the product always contains LiF.

Adequately pure LiPF$_6$ has recently been produced by reacting PF$_5$ with LiF in liquid HF. Such a method is used to manufacture LiPF$_6$ for commercial purposes. However, this method involves using the hazardous compounds HF and PF$_5$, and requires complex manufacturing equipment. Also, the product contains residual HF at a level of order of 200 to 300 ppm. The product is nonetheless suitable for use in lithium ion batteries but is relatively expensive.

U.S. Pat. No. 3,654,330 discloses an alternate method of preparing pure LiPF$_6$ from a Li(CH$_3$CN)$_4$PF$_6$ precursor. CH$_3$CN is required rather than HF using this method.

LiPF$_6$, however, even in its pure form is reported to be somewhat unstable, decomposing to PF$_5$ and LiF. Improper storage and handling of the solid accelerates this decomposition. The consequent limited shelf life and more stringent storage and handling requirements are all undesirable features associated with use of said salt. These problems are overcome to some extent by preparing solid complexes of LiPF$_6$. In the aforementioned patent (U.S. Pat. No. 3,654,330), the Li(CH$_3$CN)$_4$ PF$_6$ precursor is a complex of LiPF$_6$ and CH$_3$CN. Complexing the salt in this way stabilizes the salt against decomposition.

Similarly U.S. Pat. No. 4,880,714 discloses the preparation of a complex of LiPF$_6$ and an ether that is stable against decomposition. Said preparation involves reacting a salt of the form (XH)$^+$PF$_6^-$, wherein (XH)$^+$ is a cation comprising an adduct of a proton (H$^+$) and a Lewis base (X), with a lithium base of the form LiY in an ether based solvent. A solid complex of LiPF$_6$ and the ether is obtained by recrystallization and isolation steps. A battery electrolyte containing said ether can be prepared thereafter simply by dissolving the complex in additional appropriate solvents. However, unless said ether is desirable or at least acceptable in the electrolyte, such simple preparation is not possible. Unfortunately, ethers can be undesirable in many battery applications for a variety of reasons but especially because of possible adverse effects on battery safety. Similarly, CH$_3$CN is rarely considered desirable for use in electrolytes for commercial lithium batteries as it is not adequately stable against lithium.

Thus, state-of-the-art methods for preparing LiPF$_6$ based electrolytes, in particular electrolytes for lithium ion type batteries, generally involve recrystallization and isolation steps. The use of hazardous compounds is often involved and salt Stability is a concern.

SUMMARY OF THE INVENTION

The inventors have invented a dramatically simplified method of making effectively pure LiPF$_6$ based electrolytes for use in lithium ion type batteries. Using suitable reactants, LiPF$_6$ can be produced in a mixture of solvents that are desired in the electrolyte itself. Additionally, using a suitable reaction, impurities that remain after synthesis can be easily removed while the LiPF$_6$ remains in solution. Residual reactants and/or by-products of the reaction can be removed by filtration or centrifugation if these exist as undissolved solids, or by bubbling inert gas through the solution, or by vacuum treatment if these exist as volatiles or dissolved gases. Thus, no recrystallization and isolation steps of a LiPF$_6$ salt or complex are required. As a consequence, stability problems with the pure salt are not encountered since the salt is never taken out of solution.

The preferred reactants are NH$_4$PF$_6$ and LiH. These compounds are significantly less hazardous than HF or PF$_5$, are readily available, and are relatively easy to handle. The main by-products of the reaction are H$_2$ and NH$_3$, both gases, which can be easily removed after synthesis.

An excess of LiH can be employed in the reaction after which it can be removed by filtration or centrifugation. By-product gases, in particular NH$_3$, can be removed from the product electrolyte solution by bubbling inert gas through it or by vacuum treatment which can also include mild heating.

The solvents employed in the electrolyte can be selected from the group consisting of chain esters and cyclic esters. Specifically, electrolytes containing ethylene carbonate (EC) and DEC solvents, with PC optionally included, can be prepared in this way with LiPF$_6$ in solution at about the 1 molar level. The resulting electrolytes are suitable for use in lithium ion type batteries without additional processing. In particular, batteries employing electrolytes made according to the invention method exhibit similar performance characteristics to batteries employing conventionally prepared electrolyte. Thus, the electrolytes of the invention method are effectively pure.

A battery product employing an electrolyte prepared using the invention method can be of a lithium ion type electrochemistry wherein the cathode contains a lithium transition metal oxide and the anode contains a carbonaceous material. In particular, LiCoO$_2$ is a suitable cathode material and partially graphitized carbon or graphite are suitable anode materials.

The invention is directed to a method of preparing an electrolyte containing $LiPF_6$ in solution comprising: (a) reacting a salt of a formula $(XH)^+PF_6^-$, wherein $(XH)^+$ denotes a cation comprising an adduct of a proton ($H^+$) and a Lewis base (X), with a lithium base in a mixture of solvents to be employed in the electrolyte to form $LiPF_6$ in solution; (b) removing residual reactants and by-products of the reaction while retaining the $LiPF_6$ in solution; and (c) adding additional required solvents to be employed in the electrolyte.

BRIEF DESCRIPTION OF THE DRAWINGS

The following drawings illustrate specific embodiments of the invention but should not be construed as restricting or limiting the scope of the claims or protection in any way:

DETAILED DESCRIPTION OF SPECIFIC EMBODIMENTS OF THE INVENTION

Figure 1:
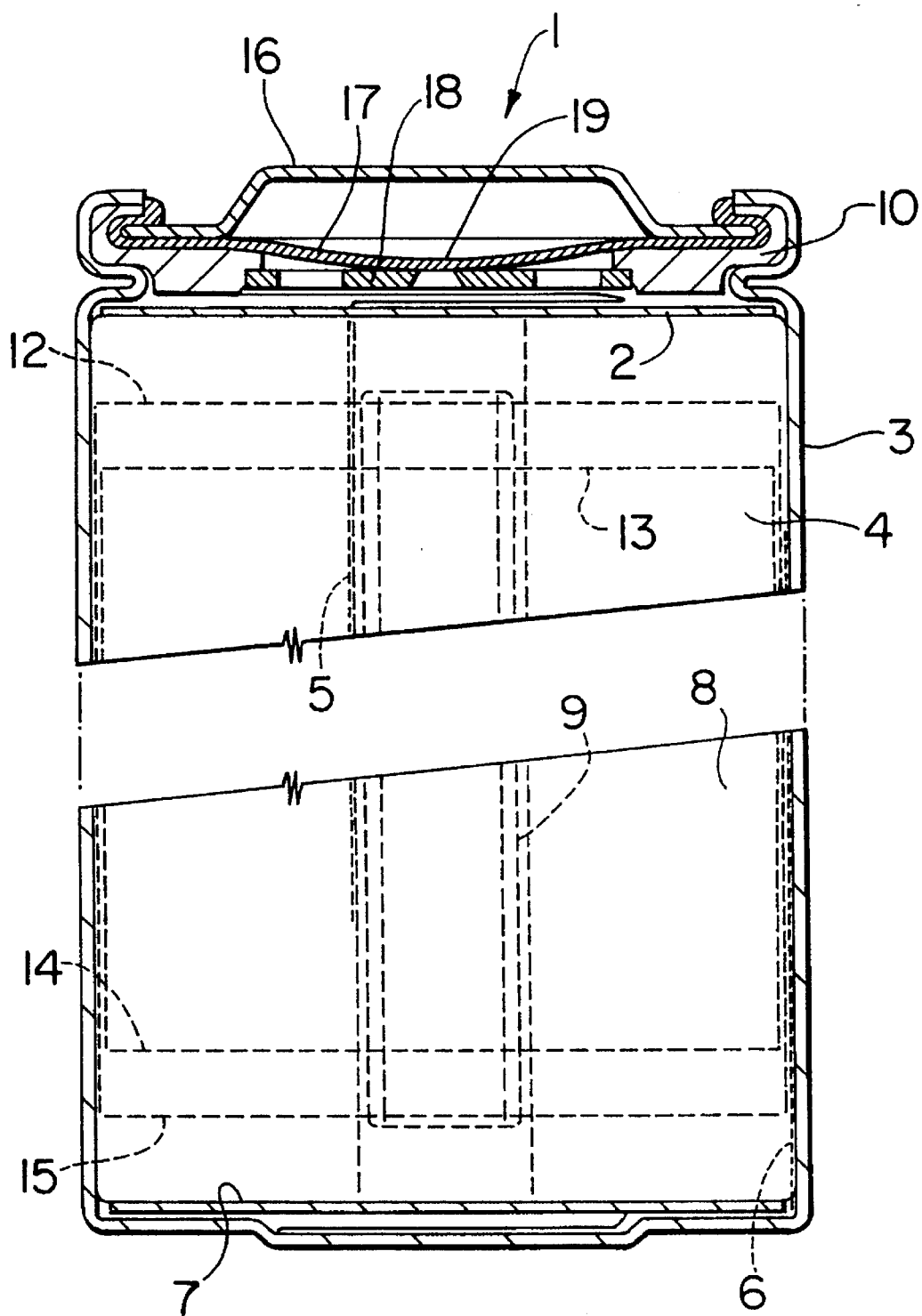
FIG. 1 depicts a cross-sectional view of a ⅔ A battery employing lithium ion type technology.

The key to applying the subject invention method successfully is being able to choose reactants and a synthesis reaction that result in residual impurities that are either easily removed while the $LiPF_6$ is in solution or that essentially do not need to be removed. Generally, this requires that any substantial amounts of residual reactant and/or by-products of the reaction be insoluble in the solvents used or that they be volatiles or gases. Thus, these impurities are easily removed by filtration or centrifugation in the case of solids or by bubbling inert gas through the solution or by treatment under vacuum in the case of volatiles or gases. Also, in general, the invention method requires that remaining soluble impurities be at a low level such that operation of a battery employing the product electrolyte is not impaired.

Preferred solvents for use in lithium ion batteries include, but are not limited to, a mixture of at least one cyclic ester and at least one chain ester. The group of cyclic esters contains the solvents ethylene carbonate (EC), propylene carbonate (PC), and the like. The group of chain esters contain the solvents diethylcarbonate (DEC), dimethylcarbonate (DMC) and the like.

At least one of the reactants must be soluble for the reaction to proceed at a realistic rate. In a preferred method of preparation, $NH_4PF_6$ and LiH are used as the reactants to prepare $LiPF_6$. A preferred electrolyte might contain about 1 mole of $LiPF_6$ salt per liter of a DEC and EC solvent mixture. In this case, EC is generally used in the invention method along with DEC so that substantial amounts of $NH_4PF_6$ can be put in solution. LiH is effectively insoluble in a DEC/EC mixture.

The amounts of the reactants can be chosen in accordance with the ideal stoichiometry of the reaction. However, it can be preferred that there be a slight excess of one reactant such that the presence of other reactants in the final product is minimized. The presence of some quantity of $NH_4PF_6$ may be considered advantageous in lithium battery electrolytes. However, the presence of some LiH may also be advantageous in that it is very reactive with water and it helps to dry the electrolyte. The products of reaction of LiH with $H_2O$ include LiOH. Although not usually desirable in principle, LiOH may not significantly affect operation of a battery if it is present in very small quantities. The solubility of LiOH in non-aqueous solvents is low, thus it can be almost completely removed by filtration.

The reactants can be added to the desired solvents in any order and can be premixed while dry if desired. Preferably, the Lewis acid containing $PF_6^-$ anion is dissolved or partially dissolved in solvents first. Then the lithium base is added slowly to this solution. In order to drive the reaction to completion, it is generally necessary to flush gaseous by-products out of solution. In a preferred reaction:

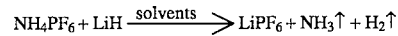

$$NH_4PF_6 + LiH \xrightarrow{\text{solvents}} LiPF_6 + NH_3\uparrow + H_2\uparrow$$

said flushing can be accomplished by bubbling an inert gas such as argon, helium, or nitrogen through the solution.

A thorough degassing/volatiles removal treatment procedure may be essential. The inventors speculate that the presence of small amounts of residual $NH_3$ in solution can result in excessive gassing during operation of lithium ion batteries employing the product electrolyte. The most favoured method to accomplish a thorough degassing/volatiles removal involves vacuum treating the electrolyte while heating mildly. Solids, such as excess insoluble LiH, can be removed after synthesis of the $LiPF_6$ salt in solution by filtration or centrifugation.

The electrolyte solution at this stage may require addition of other solvents to bring it to the desired final form. Some of the initial solvent used in the process can be lost through evaporation, especially during the thorough degassing/volatiles removal process. Solvent loss can be compensated for simply by replacing it at this stage. In a multi-solvent mixture, loss of more than one solvent can be involved during the degassing/volatiles removal process. However, in a case involving a mixture of DEC and EC wherein the former has a relatively high vapour pressure and the latter has a relatively low vapour pressure, it is usually accurate enough for all practical purposes to assume that the loss is all due to DEC evaporation. Additionally, it is assumed that the amount of any volatile impurities lost during said process is also small, and thus is negligible compared to that of a relatively high vapour pressure solvent.

Table 1 depicts the steps of the invention process for manufacturing $LiPF_6$ based electrolyte. Also depicted, for purposes of comparison, are the steps involved in conventional commercial preparation of $LiPF_6$ solid and steps of a prior art method for preparing a stabilized complex of $LiPF_6$ with ether.

TABLE 1

|  | Invention Method | Commercial Method | Prior Art Method |
|---|---|---|---|
| Reactants | $NH_4PF_6$, LiH | $PF_5$, LiF | $NH_4PF_6$, LiH |
| Solvents | Electrolyte solvents | HF | Ether |
| Basic reaction | $NH_4PF_6 + LiH \rightarrow LiPF_6 + NH_3 \uparrow + H_2 \uparrow$ | $LiF + PF_5 \rightarrow LiPF_6$ | $NH_4PF_6 + LiH + 2$ ether $\rightarrow LiPF_6 \cdot 2$ ether $+ NH_3 \uparrow + H_2 \uparrow$ |
| Further processing in solution | Removal of impurities by filtration, bubbling inert gas through solution, and/or vacuum treatment with heating | ? | Removal of impurities by bubbling inert gas through solution and heating |
| Recrystallization and isolation | No | Yes | Yes |
| Storage/handling of solid salt or complex | No | Yes | Yes |
| Final preparation step | Addition of electrolyte solvents as required | Addition of electrolyte solvents as required under temperature control | Addition of electrolyte solvents as required |
| Final product | Effectively pure electrolyte, pH neutral | 'Pure' electrolyte containing > 100 ppm HF, pH acidic | Electrolyte containing ether |

Although the invention method can be used to prepare $LiPF_6$ based electrolytes for a variety of purposes, it finds immediate potential commercial application in the production of electrolyte for use in lithium ion type batteries.

In such batteries, a lithium transition metal oxide is used as an active cathode material. A preferred material is $LiCoO_2$ powder. A partially graphitized carbon or graphite is used as an active anode material. The latter offers a greater potential specific capacity than the former, but for overall performance, safety, and other reasons, the former is often employed.

Electrodes are prepared by first making a slurry of the appropriate active material plus an optional conductive dilutant in an appropriate binder-solvent solution. The slurry is used to coat one or both sides of an appropriate current collector foil, after which the carrier solvent of the slurry is evaporated away. To maximize energy density in the final battery product, the electrodes are generally compacted between pressure rollers.

A spiral winding of a cathode and anode foil, with two microporous polyolefin films used to separate them, is subsequently prepared. A preferred embodiment of such a battery is depicted in FIG. 1, wherein a ⅔ A size battery of conventional construction is shown in cross-section.

The spiral winding 4 consisting of a double-side coated cathode and anode with two microporous polyolefin films acting as separators, is contained in a battery can 3. Often, the anode foil is wider than the cathode foil to ensure that the former is opposite the latter at all times. FIG. 1 shows the upper anode edge 12, lower anode edge 15, upper cathode edge 13, and lower cathode edge 14 of such a construction. A header assembly 1 at the top of the battery is sealed crimp-wise to the can 3 by way of gasket 10. The header assembly 1 contains a safety disconnect device that creates an internal electrical open circuit upon the application of excessive internal pressure. This header assembly 1 is described fully in a pending patent application (U.S. patent application Ser. No. 07/927,824). In summary, the header assembly 1 consists of an external metal cover 16, an electrically conductive diaphragm 17, an aluminum weld plate 18 and the gasket 10. Upon application of internal pressure, the diaphragm 17 is forced away from weld plate 18, thus breaking a critical weld 19 at a specifically set internal pressure. Diaphragm 17 flips upwardly to a stable position significantly distant from weld plate 18, thereby ensuring a reliable disconnection.

During assembly, a cathode tab 5 is generally welded to the cathode foil and an anode tab 6 is welded to the anode foil prior to making the spiral winding 4. Next the winding 4 and an appropriate lower insulator 7 are inserted into the battery can 3. The anode tab 6 is welded to the can 3. Similarly, an upper insulator 2 is inserted and the cathode tab is welded to the aluminum weld plate 18 of the header assembly 1. An appropriate amount of electrolyte 8 is then added. After this, the cathode tab 5 is folded appropriately and the header assembly 1 is positioned. The battery is crimp sealed using conventional closure methods, after which an electrical conditioning step is used to complete the manufacturing process. Generally, the conditioning step comprises a single recharge under controlled conditions, wherein several irreversible, initial electrochemical reactions take place.

The following examples are presented as illustrative of the advantages of the invention method and demonstrate how electrolyte for specific lithium ion type battery systems can be successfully prepared.

COMPARATIVE EXAMPLE 1

Commercially available high purity $LiPF_6$ salt was obtained from Hashimoto Chemical Corporation. A pH measurement was performed on said salt using pH paper in an aqueous solution containing 0.4 g salt in 5 ml of water. A one molar solution of this salt was prepared in a solvent mixture containing PC, EC and DEC with a volume ratio for PC/EC/DEC of 20/30/50. This operation was performed in a dryroom with a relative humidity around 1% at 21° C. to reduce exposure of the electrolyte to moisture. Additionally, the solvent mixture was precooled in a freezer at about −10° C. prior to adding the salt as a means of temperature control to prevent overheating due to the heat of solution. There was no precipitate present and the electrolyte solution was clear.

A ⅔ A lithium ion battery was then fabricated as explained in the foregoing disclosure. A slurry of $LiCoO_2$ powder, graphite conductive dilutant, carbon black conductive dilutant and polyvinylidene fluoride (PVDF) plastic binder in amounts of about 91%, 4%, 2% and 3% by weight respectively was prepared in N-methylpyrollidinone carrier solvent. A cathode foil was prepared by coating and drying said slurry on a 20 μm thick aluminum foil. Similarly, an anode foil was prepared on 10 μm thick copper foil using a slurry of spherical carbon powder graphitized at 2650° C., carbon black, and PVDF binder in amounts of about 88%, 2% and 10% by weight respectively. The battery as constructed contained approximately 11 g of $LiCoO_2$ cathode material and 3.9 g of graphitized carbon anode material. Celgard® 2400 microporous film was used as a separator, and the solution prepared in this example was used as the electrolyte.

Figure 2A:
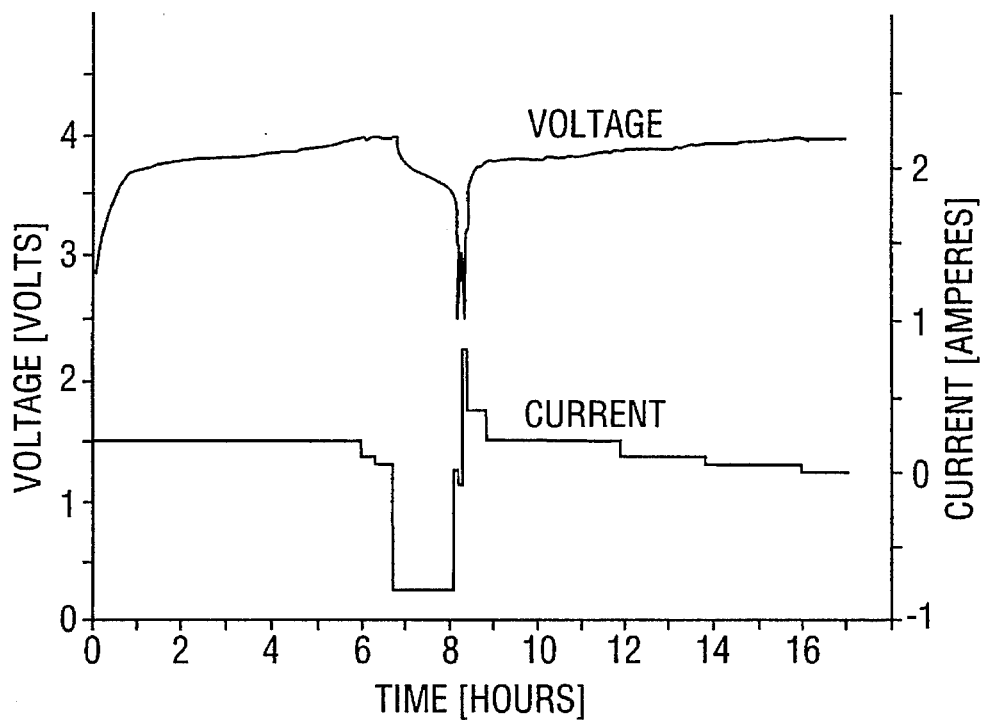
FIG. 2a depicts a plot of the voltage and current versus time curves of the ⅔ A battery of Comparative Example 1.

The battery was charged at 21° C. in constant current steps to a fixed voltage cut-off of 4 V. The currents used were 200, 100, and 50 mA. One discharge was then performed in steps of 800 mA and 80 mA to a 2.5 V cut-off, followed by a simulated taper charge at currents of 800, 400, 200, 100, and 50 mA to cut-off voltages of 3.6, 3.8, 3.9, 3.95, and 4.0 V respectively. The voltage and current versus time curves for this battery are shown in FIG. 2a and represents the baseline or standard performance expected for such a battery.

COMPARATIVE EXAMPLE 2

A one molar solution of $LiPF_6$ salt was prepared in a solvent mixture containing EC and DEC as in Comparative Example 1. The volume ratio of the solvents EC/DEC was 30/70. Again, there was no precipitate and the solution was clear.

A laboratory experimental battery was constructed to evaluate the baselineperformance of a lithium ion type electrochemistry using the electrolyte of this example. In this laboratory battery, small electrodes (circular shaped with a diameter of about 1.6 cm), coated with slurry on one side only, were employed. A small cathode was prepared in a manner effectively similar to that in Comparative Example 1, except that the coating formulation contained $LiCoO_2$, carbon black conductive dilutant, and PVDF binder in a ratio of about 91%, 6%, and 3% by weight respectively. In a like manner, a small anode was prepared using commercial graphite, carbon black, and PVDF binder in a ratio of 84%, 2%, and 14% by weight respectively. The laboratory battery as constructed contained about 38 mg of $LiCoO_2$ cathode and 18 mg of graphite anode material. Celgard® 2502 microporous film was placed between the electrodes to act as a separator. The solution of this example was used as the electrolyte. The laboratory battery was constructed such that a mechanical pressure of 80 psi was applied over the electrode surface to maintain close proximity of the components. Additionally, the contents are sealed from the atmosphere.

Figure 3A:
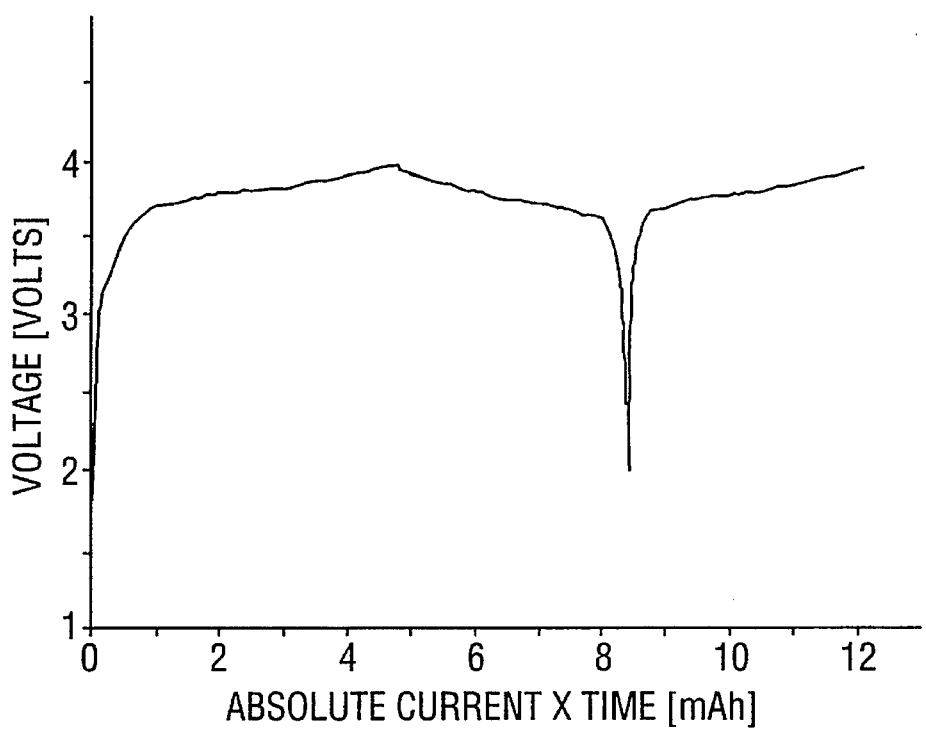
FIG. 3a depicts a plot of the voltage versus the product of absolute current and time curve of the laboratory battery of Comparative Example 2.
Figure 3B:
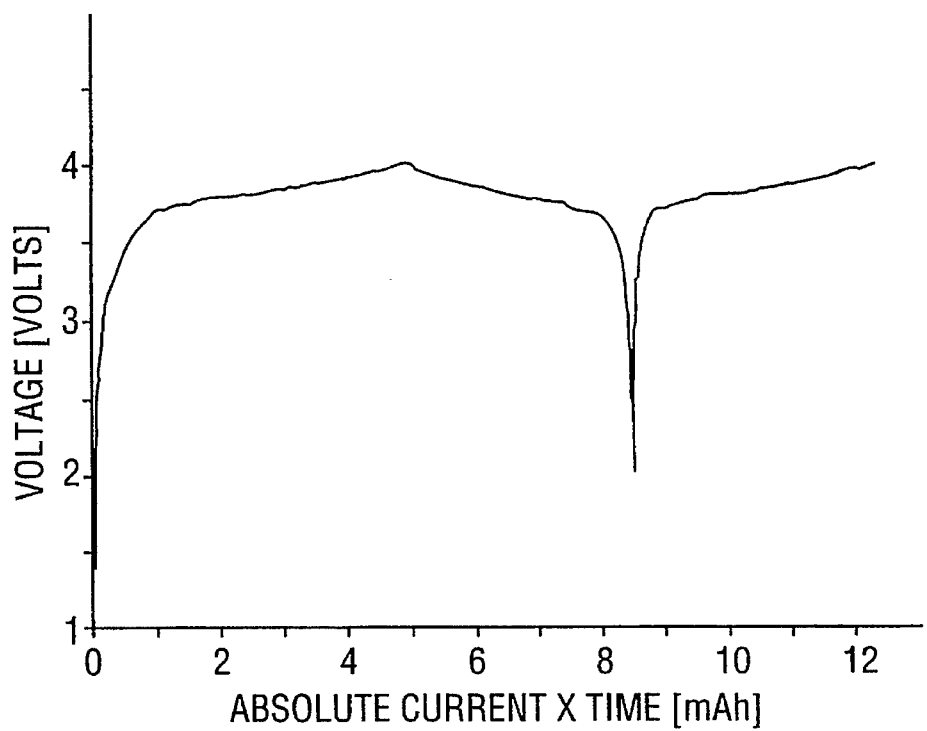
FIG. 3b depicts a plot of the voltage versus the product of absolute current and time curve of the laboratory battery of Inventive Example 2.

The cell was then conditioned by charging at a single current level of 0.5 mA to a 4.0 V upper limit at 21° C. One full cycle was then performed by discharging to a 2.0 V lower limit, followed by one additional charge to 4.0 V all at the same current of 0.5 mA. The voltage versus the product of absolute current and time curve for this battery is shown in FIG. 3a. It represents the baseline or standard performance expected for such a battery. (The currents employed herein differ from those employed for the laboratory battery of the following Inventive Example 2. For purposes of comparison, the data in FIGS. 3a and 3b is plotted against an x axis normalized by capacity.)

INVENTIVE EXAMPLE 1

81.5 g (0.5 moles) of $NH_4PF_6$ was dissolved in 0.477 L of a solvent mixture at ambient temperature containing PC/EC/DEC with a volume ratio of 20/30/50. This operation was performed in a 1 liter three-neck round bottom flask in a dryroom. 6.0 g (0.75 moles) of LiH was then placed in an attached solid addition apparatus. Thus, an excess of LiH was to be employed here.

The solution was stirred constantly using a magnetic stirrer. UHP grade helium gas was then bubbled through the solution, and the LiH was added at a constant rate over a period of one hour into the reaction flask. The helium and by-product gases were vented into a fume hood. Flushing and stirring of the solution continued for about ½ hour after the addition of the LiH was complete.

Next, the solution was removed and filtered through 0.7 μm glass fibre filter paper to remove excess LiH. The filtrate was then degassed by vacuum treatment of the solution at 65° C. at reduced pressure for approximately 30 minutes. The pressure level during vacuum treatment was estimated to be about 10 Torr.

During the degassing/volatiles removal procedure, approximately 150 grams of solvent was lost. For all practical purposes, it was assumed that this was due to loss of the solvent with the relatively high vapour pressure, in this case DEC. A similar weight of DEC was added to the solution to replace that lost during said procedure.

The resulting electrolyte was approximately 1M $LiPF_6$ in a PC/EC/DEC solvent mixture with volume ratio 20/30/50. A pH measurement was performed using pH paper in an aqueous solution containing 1 ml of the electrolyte in 5 ml of water. The pH measurement indicated that the electrolyte solution was essentially neutral. There was no precipitate and the solution was clear. Thus, effective removal of the by-product $NH_3$ was accomplished, and there is no acidic impurity.

Figure 2B:
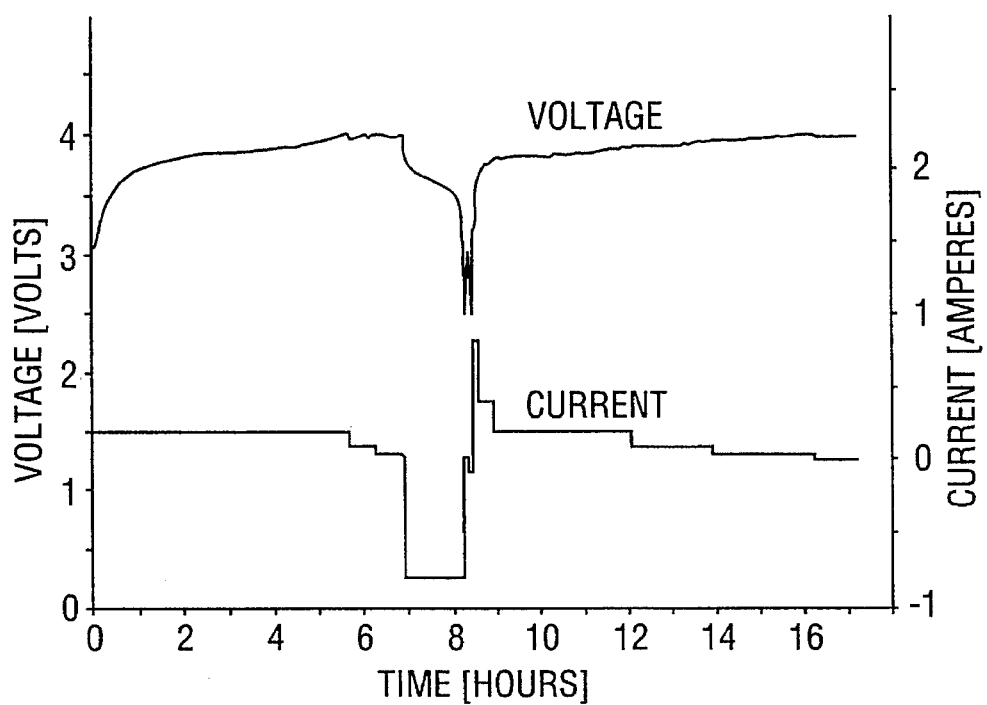
FIG. 2b depicts a plot of the voltage and current versus time curves of the ⅔ A battery of Inventive Example 1.

A ⅔ A battery was fabricated as described in Comparative Example 1 except that the electrolyte used was that of this invention example. The battery was conditioned and cycled as described earlier. The voltage and current versus time curves for the invention battery are shown in FIG. 2b. The performance is similar to that of the battery of FIG. 2a, indicating that the invention electrolyte is effectively similar to the baseline electrolyte when using this lithium ion type electrochemistry.

INVENTIVE EXAMPLE 2

Under helium gas protection, 16.3 g (0.1 mole) of $NH_4PF_6$ solids was mixed with 1.2 g (0.15 mole) LiH solids in a 0.5 L three-neck round bottom flask fitted with tubing for purposes of bubbling helium gas through the solution to be made. Again, an excess of LiH was to be employed. 0.094 L of the solvent mixture EC/DEC, 30/70 ratio by volume at ambient temperature, was added via an addition funnel slowly at first and continuing over a 30 minute period. Throughout this period, the solution was continuously stirred via magnetic stirrer and was flushed via bubbling of helium gas through the solution. Stirring and flushing was continued for an additional 1½ hours. A FTIR spectrum of a sample of solution was then taken. Based on the absence of reactant peaks in the spectrum, the reaction was considered complete. Degassing of the solution was performed next as described previously in Inventive Example 1. Approximately 30 g was lost as a result of the degassing/volatiles removal process, so the same weight of DEC was added to compensate for this loss.

The resulting electrolyte was pH neutral, clear, and had no precipitate. A laboratory experimental battery was made as described in Comparative Example 2 except that the solution of this inventive example was employed as the electrolyte.

The laboratory battery was conditioned and cycled once as described previously. A current of 0.145 mA was used for both charge and discharge. The voltage versus the product of absolute current and time data for the battery is shown in FIG. 3b. The performance is almost identical to that of the Comparative battery in FIG. 3a, indicating that the invention electrolyte is effectively the same as the baseline electrolyte using this lithium ion type electrochemistry.

ILLUSTRATIVE EXAMPLE 1

An electrolyte solution was prepared as described in Inventive Example 1, except that degassing by vacuum treatment was not performed. After overnight storage at 20° C., a white precipitate could be seen in the flask. Additionally, a pH measurement indicated that the electrolyte was quite basic. The solution was filtered again using glass fibre filter paper.

Figure 4:
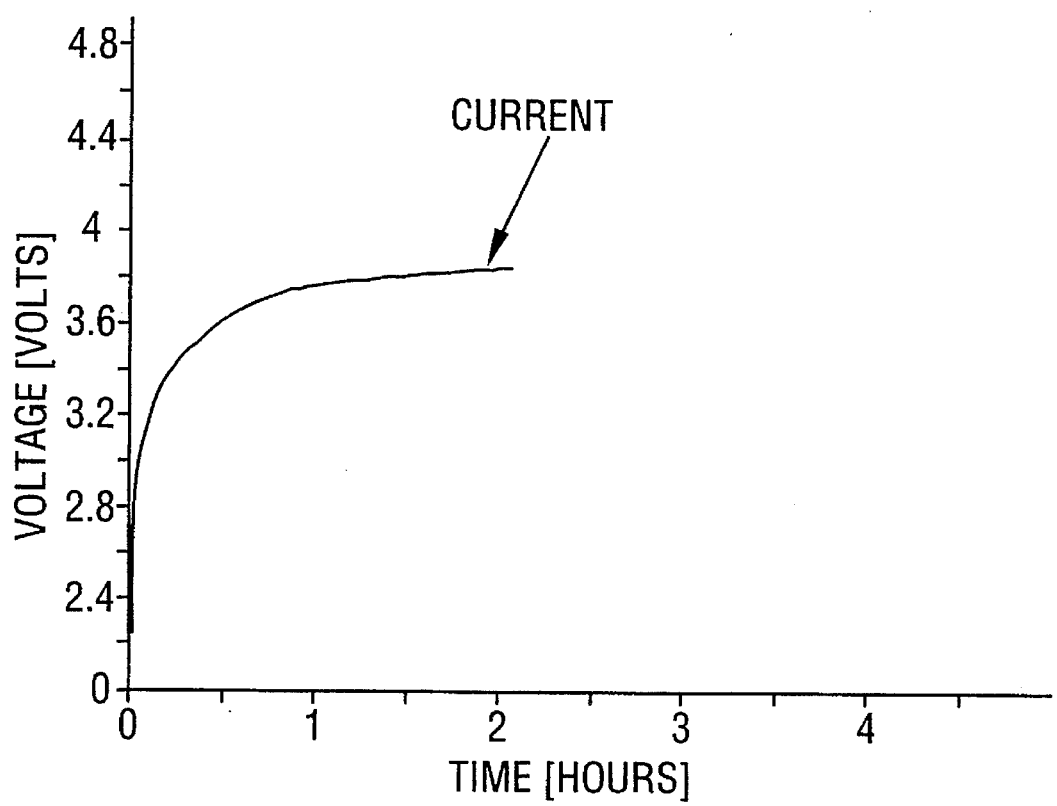
FIG. 4 depicts a plot of the voltage versus time curve of the ⅔ A battery of Illustrative Example 1.

A ⅔ A battery was fabricated as described previously in Comparative Example 1 except that the solution of this Illustrative Example was used as the electrolyte. The battery was to be conditioned as described previously. However, just about 3.8 V during the first charge step, the safety disconnect device was activated, creating an open circuit, due to the presence of excessive internal pressure in the battery. The voltage versus time curve for this battery is shown in FIG. 4.

This example illustrates that excessive gassing may occur in a lithium ion battery if adequate degassing/volatile removal treatment is not performed on electrolytes prepared by the invention method.

ILLUSTRATIVE EXAMPLE 2

A portion of the electrolyte solution prepared in Comparative Example 1 was stored in a sealed vessel for 30 days at 21° C. The solution had discolored and was now brownish-yellow. A portion of the electrolyte solution prepared in Inventive Example 1 was stored in a sealed vessel for 72 days at 21° C. The solution was still clear.

This example demonstrates that some deterioration of electrolyte prepared from commercially available $LiPF_6$ occurs during storage. Electrolyte prepared by the invention method does not seem to deteriorate at the same rate or at least in the same manner.

As will be apparent to those skilled in the art in the light of the foregoing disclosure, many alterations and modifications are possible in the practice of this invention without departing from the spirit or scope thereof. While the examples in the foregoing disclosure described the preparation of DEC, EC, and optionally PC based electrolytes, the invention method is expected to apply to a wide variety of other possible solvent combinations. Similarly, a wide range of moralities for such electrolyte solutions is expected to be possible. The presence of limited amounts of impurities that may result from the application of this method can be acceptable, thereby making the electrolyte effectively pure. In addition, while $NH_4PF_6$ and LiH appear to be the preferred reactants for this invention, the invention method can be applied in principle to other reactant choices. The requirement is that the removal of any post-reaction impurities, that are not acceptable in the final electrolyte solution, is accomplished with the $LiPF_6$ remaining in solution. Accordingly, the scope of the invention is to be construed in accordance with the substance defined by the following claims.

What is claimed is:

1. A method of preparing an electrolyte containing $LiPF_6$ in solution comprising:

(a) reacting a salt having a formula $(XH)^+PF_6^-$, wherein $(XH)^+$ denotes a cation comprising an adduct of a proton ($H^+$) and a Lewis base (X), with a lithium base in a solvent to be employed in the electrolyte that does not form a $LiPF_6$ salt or complex, so that $LiPF_6$ is formed in solution;

(b) removing residual reactants and by-products of the reaction while the $LiPF_6$ remains in solution, with no recrystallization or isolation of a $LiPF_6$ solvent salt or complex; and (c) adding additional required solvents employed in the electrolyte, so that an $LiPF_6$ electrolyte is provided that is suitable for use in lithium ion-type batteries without additional processing.

2. A method as in claim 1 wherein solid residual reactants or by-products are removed by filtration.

3. A method as in claim 1 wherein solid residual reactants or by-products are removed by centrifugation.

4. A method as in claim 1 wherein gaseous residual reactants or by-products are removed by bubbling an inert gas through the solution.

5. A method as in claim 1 wherein gaseous residual reactants or by-products are removed by vacuum treatment.

6. A method as in claim 5 wherein the vacuum treatment includes heating at a temperature of about 65° C.

7. A method as in claim 1 wherein the salt is $NH_4PF_6$.

8. A method as in claim 1 wherein the lithium base is LiH.

9. A method as in claim 1 wherein the salt is $NH_4PF_6$, the lithium base is LiH, residual LiH reactant is removed by filtering, and $NH_3$ by-product and other volatile impurities are removed by bubbling an inert gas through the solution.

10. A method as in claim 9 wherein the $NH_3$ by-product and other volatile impurities are removed by vacuum treatment which includes heating at a temperature of about 65° C.

11. A method as in claim 9 wherein the solvents employed in the electrolyte are selected from the group consisting of chain esters and cyclic esters.

12. A method as in claim 11 wherein the solvents employed are ethylene carbonate and diethylcarbonate.

13. A method as in claim 12 wherein the solvents include propylene carbonate.

14. A method as in claim 12 wherein the electrolyte contains about 1 mole of $LiPF_6$ per liter of solution.

* * * * *